US012442635B2

(12) United States Patent
Kyokane et al.

(10) Patent No.: US 12,442,635 B2
(45) Date of Patent: Oct. 14, 2025

(54) SUBSTRATE PROCESSING APPARATUS, SUBSTRATE PROCESSING METHOD, AND STORAGE MEDIUM

(71) Applicant: Tokyo Electron Limited, Tokyo (JP)

(72) Inventors: Hirokazu Kyokane, Yamanashi (JP); Hidefumi Matsui, Yamanashi (JP); Toshiyuki Fukumoto, Yamanashi (JP); Satoshi Itoh, Yamanashi (JP); Masashi Imanaka, Yamanashi (JP); Toyohisa Tsuruda, Yamanashi (JP); Masashi Enomoto, Yamanashi (JP); Masahiro Yanagisawa, Yamanashi (JP)

(73) Assignee: Tokyo Electron Limited, Tokyo (JP)

( * ) Notice: Subject to any disclaimer, the term of this patent is extended or adjusted under 35 U.S.C. 154(b) by 107 days.

(21) Appl. No.: 17/903,444

(22) Filed: Sep. 6, 2022

(65) Prior Publication Data

US 2023/0085325 A1 Mar. 16, 2023

(30) Foreign Application Priority Data

Sep. 14, 2021 (JP) .................. 2021-149547

(51) Int. Cl.
*G01B 11/06* (2006.01)
*G06T 7/60* (2017.01)
(52) U.S. Cl.
CPC ............ *G01B 11/0616* (2013.01); *G06T 7/60* (2013.01); *G06T 2207/20081* (2013.01); *G06T 2207/30148* (2013.01)

(58) Field of Classification Search
CPC ............ G01B 11/0616; G01B 11/0641; G01B 11/0675; G06T 7/60; G06T 2207/20081; G06T 2207/30148; G01N 21/211; G01N 21/213
See application file for complete search history.

(56) References Cited

U.S. PATENT DOCUMENTS

| | | | |
|---|---|---|---|
| 11,906,281 B2 * | 2/2024 | Ghim ................. | G01B 11/0675 |
| 2002/0113210 A1 * | 8/2002 | Treado ................. | G02B 21/06 |
| | | | 250/331 |
| 2003/0197864 A1 * | 10/2003 | Wei ...................... | G01B 11/065 |
| | | | 374/E11.018 |
| 2013/0038883 A1 * | 2/2013 | Yamazaki ............ | G01N 21/211 |
| | | | 356/630 |
| 2014/0340682 A1 * | 11/2014 | Kwak ................. | G01N 21/274 |
| | | | 356/369 |

(Continued)

FOREIGN PATENT DOCUMENTS

| | | |
|---|---|---|
| JP | H06-224126 A | 8/1994 |
| JP | 2008-286630 A | 11/2008 |

(Continued)

*Primary Examiner* — Kara E. Geisel
*Assistant Examiner* — Jonathon Cook
(74) *Attorney, Agent, or Firm* — Fenwick & West LLP (57) ABSTRACT

A substrate processing apparatus includes: an imaging portion configured to acquire a surface image of a film formed on a surface of a substrate; an optical property estimation portion configured to estimate an optical property of the film based on process information acquired during formation of the film; and a film thickness estimation portion configured to estimate a film thickness of the film based on the surface image and an estimation result of the optical property.

9 Claims, 9 Drawing Sheets

(56) References Cited

U.S. PATENT DOCUMENTS

| | | | |
|---|---|---|---|
| 2015/0324970 A1* | 11/2015 | Iwanaga | G06T 7/60 |
| | | | 382/145 |
| 2020/0051235 A1 | 2/2020 | Majumdar et al. | |
| 2020/0225151 A1* | 7/2020 | Wang | G01N 21/3563 |
| 2021/0270673 A1* | 9/2021 | Thompson | H01J 37/32422 |
| 2021/0365770 A1* | 11/2021 | Bhatia | G06N 20/20 |
| 2022/0214662 A1* | 7/2022 | Panda | H01L 21/67276 |

FOREIGN PATENT DOCUMENTS

| | | |
|---|---|---|
| JP | 2015215193 A | 12/2015 |
| JP | 2017-122580 A | 7/2017 |
| JP | 2019-047100 A | 3/2019 |
| JP | 2020-512681 A | 4/2020 |
| WO | WO 2018/102134 A1 | 6/2018 |

* cited by examiner

| PROCESS INFORMATION | IMAGE DATA | ACTUAL MEASUREMENT VALUE OF FILM THICKNESS | ACTUAL MEASUREMENT VALUE OF REFRACTIVE INDEX | ACTUAL MEASUREMENT VALUE OF EXTINCTION COEFFICIENT | ESTIMATION ERROR OF FILM THICKNESS |
|---|---|---|---|---|---|
| ... | ... | ... | ... | ... | ... |
| ... | ... | ... | ... | ... | ... |
| ... | ... | ... | ... | ... | ... |
| ... | ... | ... | ... | ... | ... |
| ... | ... | ... | ... | ... | ... |
| ... | ... | ... | ... | ... | ... |

SUBSTRATE PROCESSING APPARATUS, SUBSTRATE PROCESSING METHOD, AND STORAGE MEDIUM

CROSS-REFERENCE TO RELATED APPLICATIONS

This application claims priority to Japanese Patent Application No. 2021-149547 filed on Sep. 14, 2021, the entire contents of which are incorporated herein by reference.

TECHNICAL FIELD

The present disclosure relates to a substrate processing apparatus, a substrate processing method, and a storage medium.

BACKGROUND

Japanese Laid-open Patent Publication No. 2015-215193 discloses a film thickness measuring device for calculating a film thickness of a film formed on a substrate based on correlation data between an imaged image of a substrate and a film thickness of a film formed on the substrate, and an imaged image of the substrate whose film thickness is to be measured.

SUMMARY

The present disclosure provides an apparatus for easily estimating a film thickness of a film formed on a surface of a substrate with high reliability.

In accordance with an aspect of the present disclosure, there is provided a substrate processing apparatus comprising: an imaging portion configured to acquire a surface image of a film formed on a surface of a substrate: an optical property estimation portion configured to estimate an optical property of the film based on process information acquired during formation of the film; and a film thickness estimation portion configured to estimate a film thickness of the film based on the surface image and an estimation result of the optical property.

DETAILED DESCRIPTION

Hereinafter, embodiments will be described in detail with reference to the drawings. In the description, the same components or components having the same function are designated by the same reference numerals, and overlapping descriptions will be omitted.

[Substrate Processing Apparatus]

Figure 1:
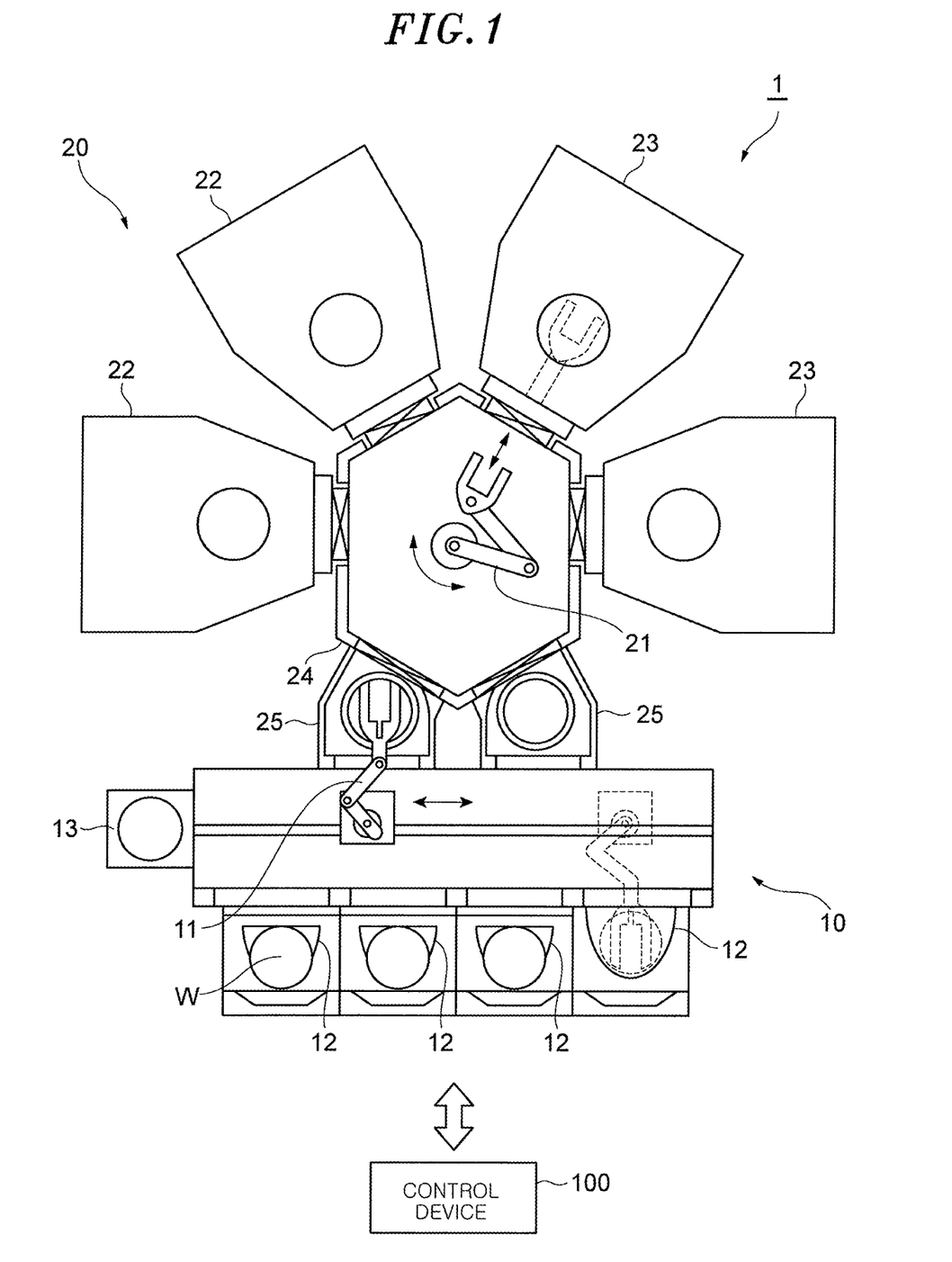
FIG. 1 is a schematic diagram illustrating a schematic configuration of a substrate processing apparatus.

A substrate processing apparatus 1 illustrated in FIG. 1 is an apparatus for forming a film on the surface of a substrate. Specific examples of the substrate include a semiconductor wafer, a glass substrate, a mask substrate, a flat panel display (FPD) or the like. The substrate also includes a semiconductor wafer or the like on which a film or the like is formed in the process of a previous stage. The substrate processing apparatus 1 includes a loader module 10, a processing module 20, and a control device 100.

The loader module 10 loads a substrate W into the substrate processing apparatus 1 and unloads the substrate W from the substrate processing apparatus 1. For example, the loader module 10 can support a plurality of carriers 12 (accommodation portions) for the substrate W, and has a delivery arm 11 built in a housing whose inside is set to atmospheric pressure. The carrier 12 accommodates, for example, a plurality of circular substrates W. The delivery arm 11 takes out the substrate W from the carrier 12 and transfers it to a load lock module 25 (described later) of the processing module 20, and receives the substrate W from the load lock module 25 and returns it to the carrier 12. An aligner 13 for calibrating the position of the substrate W may be connected to the loader module 10.

The processing module 20 performs a processing for forming a film on the surface of the substrate W. The processing for forming the film may be a processing of a film formation, or may be a processing for partially removing the formed film. The processing for forming the film may include both the processing of the film formation and the processing for partially removing the formed film.

Specific examples of the processing of the film formation include a processing for growing a film on the surface of the substrate W, a processing for applying a film material to the surface of the substrate W, and the like. Specific examples of the processing for growing the film on the surface of the substrate W include physical vapor deposition (PVD), chemical vapor deposition (CVD), atomic layer deposition (ALD) or the like. Specific examples of the processing for applying the film material to the surface of the substrate W include spin coating in which a liquid film material is spread on the surface of the substrate W by rotating the substrate W or the like. Specific examples of the processing for partially removing the formed film include wet etching, dry etching, polishing or the like.

For example, the processing module 20 includes a transfer chamber 24 capable of depressurizing, a transfer arm 21 provided in the transfer chamber 24, one or more process units 22 connected to the transfer chamber 24 via a gate valve, one or more imaging portions 23, and one or more load lock modules 25. The transfer arm 21 receives the substrate W from the load lock module 25 and transfers it. The inside of the load lock module 25 can be switched between atmospheric pressure and vacuum pressure, and the load lock module 25 is connected to the loader module 10 via a gate valve.

Each of the one or more process units 22 performs a processing for forming a film on the surface of the substrate W transferred by the transfer arm 21. For example, the process unit 22 performs a processing for forming a film on the surface of the substrate W. As an example, the process unit 22 forms a TiN film on the surface of the substrate W by the above-mentioned ALD.

For example, the process unit 22 performs thermal ALD to supply reaction gas and purge gas to the surface of the substrate W while heating the substrate W to promote a reaction. Specific examples of the reaction gas include $TiCl_4$ gas, $NH_3$ gas and the like. Specific examples of the purge gas include $N_2$ gas, Ar gas and the like. The process unit 22 may be configured to perform plasma ALD that promotes the reaction by using plasma.

Figure 2:
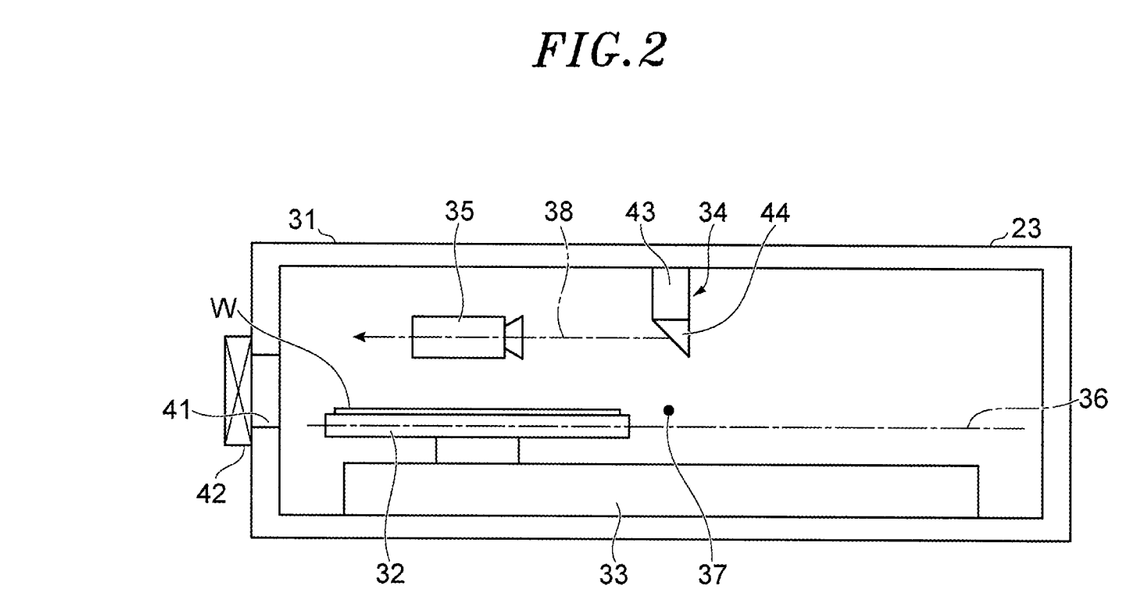
FIG. 2 is a schematic diagram illustrating a schematic configuration of an imaging portion.

The imaging portion 23 acquires a surface image of the film formed by the process unit 22. As illustrated in FIG. 2, the imaging portion 23 includes a housing 31, a holding portion 32, a transfer portion 33, a lighting module 34, and a camera 35. The housing 31 accommodates the substrate W to be imaged. The housing 31 has a loading/unloading port 41 for receiving the substrate W and a gate valve 42 for opening and closing the loading/unloading port 41.

The holding portion 32 holds the substrate horizontally arranged in the housing 31. The transfer portion 33 transfers the holding portion 32 along a horizontal transfer direction 36 by a power source such as an electric motor. As a result, the substrate W held by the holding portion 32 is transferred along the transfer direction 36.

The lighting module 34 irradiates the substrate W transferred along the transfer direction 36 with illumination light from above. For example, the lighting module 34 has a light source 43 and a half mirror 44. The light source 43 emits illumination light downward and irradiates the illumination light along an irradiation line 37 perpendicular to and horizontal to the transfer direction 36. In the transfer direction 36, the substrate W is transferred so as to pass through the irradiation line 37.

The half mirror 44 transmits illumination light from the light source 43 toward the irradiation line 37. On the other hand, the half mirror 44 reflects the light from the irradiation line 37 toward the camera 35. The camera 35 receives the reflected light reflected by the half mirror 44 and images the irradiation line 37. The camera 35 repeatedly images the irradiation line 37 while the substrate W passes through the irradiation line 37. The imaging portion 23 collects a plurality of images imaged by the camera 35 while the substrate W passes through the irradiation line 37 to generate a surface image of the substrate W (surface image of a film).

The image data of the surface image of the substrate W (hereinafter, referred to as "surface image data") includes a plurality of pixel values mapped in a matrix form in an imaging area of the surface image. Each of the plurality of pixel values represents a color of any one section in the imaging area. The color includes hue, saturation, and lightness. For example, the pixel value represents the light intensity of each of the three primary colors (R, G, B).

The control device 100 controls the loader module 10 and the processing module 20 to form a film on the surface of the substrate W. Herein, the surface image and the film thickness of the film tend to correlate with each other. For example, the color of the surface image may change depending on the film thickness. By using this, the control device 100 estimates the film thickness of the film based on the surface image acquired by the imaging portion 23. Since the film thickness can be estimated based on the surface image in a short time, it is possible to increase the frequency of evaluating the film thickness of the film while suppressing a decrease in throughput.

However, the relationship between the surface image and the film thickness can change depending on the optical properties of the film. Therefore, the reliability of the film thickness estimation result may decrease due to the influence of variations in the optical properties of the film.

In this regard, the control device 100 is configured to estimate the optical properties of the film based on process information acquired during formation of the film, and estimate the film thickness of the film based on the surface image and an estimation result of the optical properties. As a result, the influence of variations in the optical properties can be reduced, and the film thickness can be estimated with high reliability.

Figure 3:
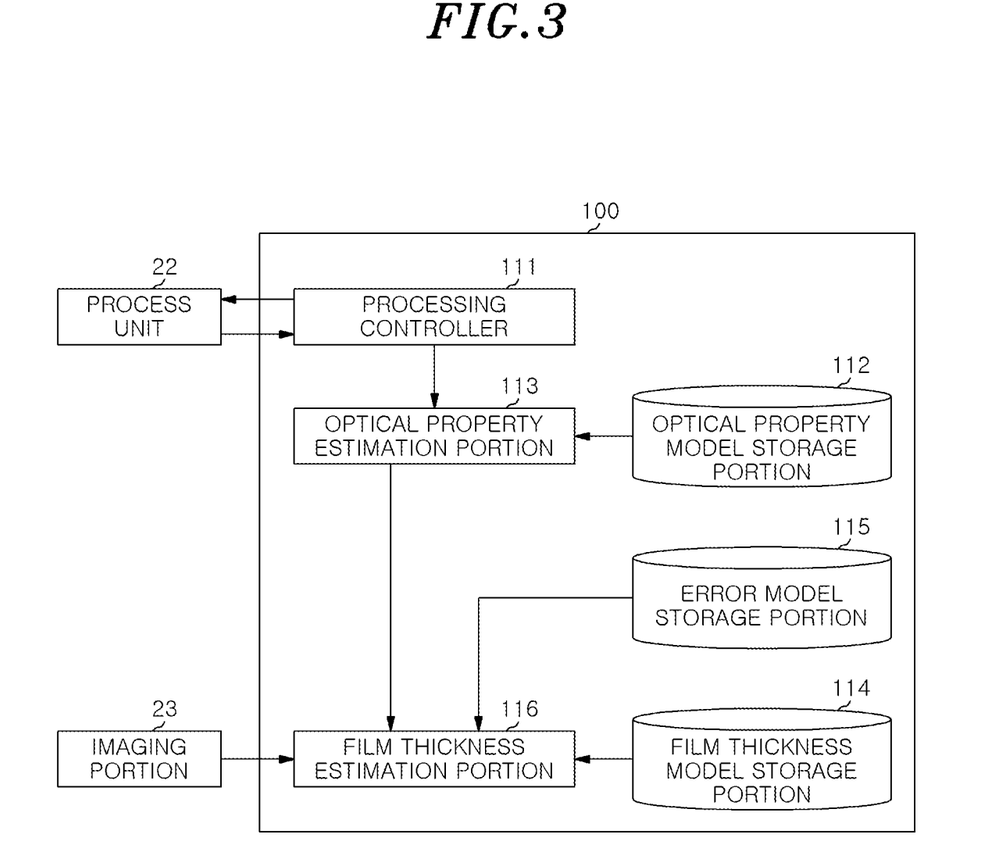
FIG. 3 is a block diagram illustrating a functional configuration of a control device.

For example, as illustrated in FIG. 3, the control device 100 has a processing controller 111, an optical property model storage portion 112, an optical property estimation portion 113, a film thickness model storage portion 114, an error model storage portion 115, and a film thickness estimation portion 116, as functional components. The processing controller 111 causes the processing module 20 to execute a processing for forming a film on the surface of the substrate W after the substrate W is loaded into the process unit 22 by the transfer arm 21. For example, the processing controller 111 controls the delivery arm 11 to take out the substrate W from the carrier 12 and load the substrate W into the load lock module 25. Next, the processing controller 111 controls the transfer arm 21 to receive the substrate W loaded into the load lock module 25 by the delivery arm 11 and load it into the process unit 22, and controls the process unit 22 to form a film on the surface of the substrate W. Next, the processing controller 111 controls the transfer arm 21 to receive the substrate W from the process unit 22 and load it into the imaging portion 23, and controls the imaging portion 23 to acquire the surface image data. Next, the processing controller 111 controls the transfer arm 21 to receive the substrate W from the imaging portion 23 and pass it to the load lock module 25. Next, the processing controller 111 controls the delivery arm 11 to return the substrate W received from the load lock module 25 to the carrier 12.

The process unit 22 acquires the process information during processing. The process information includes surrounding environment information of the substrate W during processing. For example, the process information includes surrounding environment information of the substrate W when forming a film on the surface of the substrate W. The surrounding environment information includes an operating status of a device, an outside air temperature, humidity, and the like.

For example, when executing the ALD, the process unit 22 acquires a temperature of a heater that heats the substrate W, a pressure in the process unit 22, a pressure of the reaction gas, a flow rate of the reaction gas, a pressure of the purge gas, a flow rate of the purge gas, an indoor temperature of a clean room (a clean room where the substrate processing apparatus 1 is installed), a processing time, and the like as the surrounding environment information. When performing the plasma ALD, the process unit 22 may acquire high-frequency power and voltage applied for generating plasma as the surrounding environment information.

When the process unit 22 performs a processing for partially removing a film as a processing for forming the film, the process information includes surrounding environment information of the substrate W when the film is partially removed.

The optical property model storage portion 112 stores an optical property model. The optical property model is generated in advance to represent the relationship between the process information acquired during formation of a film and an optical property of the film. The optical property model may be generated to represent the relationship between the process information acquired during formation of the film and the optical properties at a plurality of locations on the surface of the substrate W. As an example, the optical property model is generated to represent the relationship between the process information acquired by the process unit 22 and the optical properties of a plurality of locations respectively corresponding to the plurality of pixel values.

The optical property represents the effect of the film on light that has entered the film. For example, the optical property includes at least one of a refractive index of the film and an extinction coefficient of the film. The refractive index of the film is expressed as the ratio of the propagation speed of light in the air to the propagation speed of light in the film. The extinction coefficient of the film represents the attenuation of light propagating through the film.

The optical property model may be any as long as it represents the relationship between the process information and the optical property of the film. For example, the optical property model may be a trained model acquired by machine learning so as to output the optical properties at the plurality of locations in response to the input of process information. Specific examples of machine learning include multiple regression, Gaussian regression, deep learning, and the like. Specific examples of the trained model include a neural network and the like. The trained model may be a function or a look-up table.

The optical property estimation portion 113 estimates the optical property of the film based on the process information acquired by the process unit 22. For example, the optical property estimation portion 113 estimates the optical property of the film based on the process information acquired by the process unit 22 and the optical property model stored in the optical property model storage portion 112. For example, the optical property estimation portion 113 inputs the process information into the optical property model to output the optical property corresponding to the process information. The optical property estimation portion 113 may estimate the optical properties at the plurality of locations based on the process information and the optical property model.

The film thickness model storage portion 114 stores a film thickness model. The film thickness model is generated in advance to represent the relationship between the surface image and the film thickness of the film. The film thickness model may be generated in advance to represent the relationship between the surface image and the film thicknesses at a plurality of locations on the surface of the substrate W. As an example, the film thickness model is generated to represent the relationship between the surface image data acquired by the imaging portion 23 and the film thicknesses at a plurality of locations respectively corresponding to the plurality of pixel values.

The film thickness model may be any as long as it represents the relationship between the surface image and the film thickness. For example, the film thickness model may be a trained model acquired by machine learning so as to output the film thicknesses at the plurality of locations in response to the input of the image data of the surface image (hereinafter, referred to as "surface image data"). Specific examples of machine learning include multiple regression, Gaussian regression, deep learning, and the like. Specific examples of the trained model include a neural network and the like. The trained model may be a function or a look-up table.

The error model storage portion 115 stores an error model. The error model is generated in advance to represent the relationship between the optical property and an estimation error of the film thickness. The estimation error of the film thickness is an estimation error of the film thickness based on the film thickness model stored in the film thickness model storage portion 114.

The error model may be any as long as it represents the relationship between the optical property and the estimation error of the film thickness. For example, the error model may be a trained model acquired by machine learning so as to output the estimation error of the film thickness in response to the input of the optical property. Specific examples of machine learning include multiple regression, Gaussian regression, deep learning, and the like. Specific examples of the trained model include a neural network and the like. The trained model may be a function or a look-up table.

The film thickness estimation portion 116 estimates the film thickness of the film based on the surface image data acquired by the imaging portion 23 and the estimation result of the optical property by the optical property estimation portion 113. For example, the film thickness estimation portion 116 tentatively estimates the film thickness based on the film thickness model stored in the film thickness model storage portion 114 and the surface image data acquired by the imaging portion 23, and corrects the tentative estimation result of the film thickness based on the optical property estimated by the optical property estimation portion 113 to estimate the film thickness. The film thickness estimation portion 116 may estimate an error based on the error model stored in the error model storage portion 115 and the optical property estimated by the optical property estimation portion 113, and may correct the tentative estimation result of the film thickness based on an estimation result of the error.

For example, the film thickness estimation portion 116 tentatively estimates the film thickness based on the film thickness model stored in the film thickness model storage portion 114 and the surface image data acquired by the imaging portion 23. For example, the film thickness estimation portion 116 inputs the surface image data to the film thickness model, and causes the film thickness model to output the tentative estimation result of the film thickness corresponding to the surface image data. The film thickness estimation portion 116 may tentatively estimate the film thicknesses at the plurality of locations based on the film thickness model and the surface image data.

The film thickness estimation portion 116 estimates the estimation error of the film thickness based on the optical property of the film estimated by the optical property estimation portion 113 and the error model stored in the error model storage portion 115. For example, the film thickness estimation portion 116 inputs the optical property to the error model, and causes the error model to output the estimation error of the film thickness corresponding to the optical property. The film thickness estimation portion 116 corrects the tentative estimation result of the film thickness based on the estimation error of the film thickness. For example, the film thickness estimation portion 116 adds the estimation error of the film thickness to the tentative estimation result of the film thickness, or subtracts the estimation error of the film thickness from the tentative estimation result of the film thickness.

The film thickness estimation portion 116 may correct each of the tentative estimation results of the film thicknesses at the plurality of locations based on the estimation results of the optical properties at the plurality of locations by the optical property estimation portion 113. For example, the film thickness estimation portion 116 adds each of the estimation results of the optical properties at a plurality of locations to the tentative estimation result of the film thickness at the same location, or subtracts same therefrom. In addition, while the film thickness estimation portion 116 tentatively estimates the film thicknesses at a plurality of locations, the optical property estimation portion 113 may estimate one optical property for the entire film. For example, the optical property estimation portion 113 may estimate the average optical property of the entire film. In this case, the film thickness estimation portion 116 corrects the tentative estimation results of the film thicknesses at a plurality of locations based on the one optical property.

The film thickness estimation portion 116 may display the estimation result of the film thickness on a display device (for example, a display device 195 described later). Further, the film thickness estimation portion 116 may add the estimation result of the film thickness to the log data recorded for each substrate W. Further, the film thickness estimation portion 116 may notify an error by displaying it on the display device 195 or the like when the estimation result of the film thickness is out of a predetermined allowable range.

Figure 4:
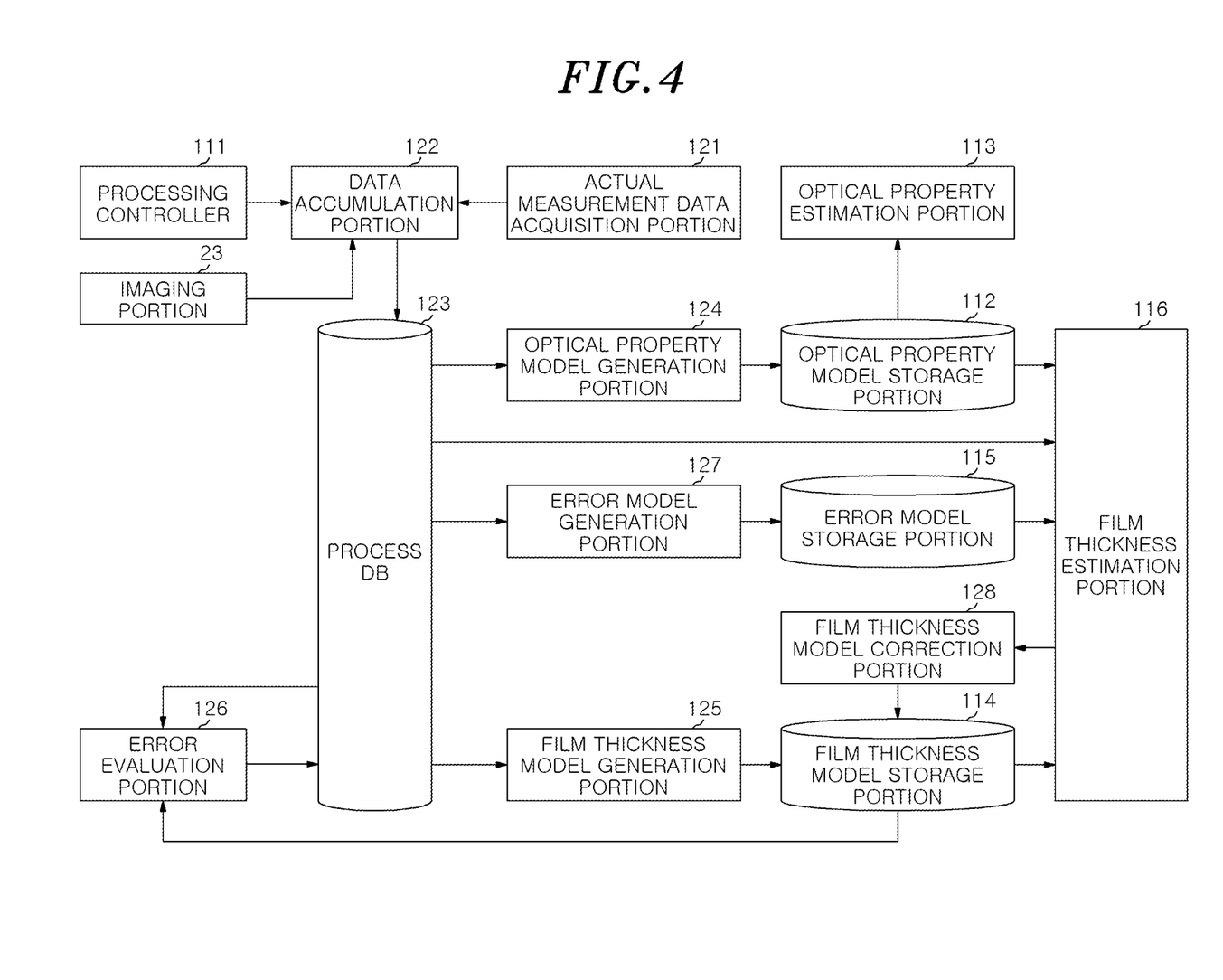
FIG. 4 is a block diagram illustrating a functional configuration of the control device.

The control device 100 may be configured to generate at least one of the optical property model, the error model, and the film thickness model, based on the accumulated data. For example, as illustrated in FIG. 4, the control device 100 may further include an actual measurement data acquisition portion 121, a data accumulation portion 122, a database 123, an optical property model generation portion 124, a film thickness model generation portion 125, an error evaluation portion 126, an error model generation portion 127, and a film thickness model correction portion 128.

The actual measurement data acquisition portion 121 acquires actual measurement data of the film by an ellipsometry method or the like. The actual measurement data includes the actual measurement value of the film thickness and the actual measurement value of the optical property.

Figure 5:
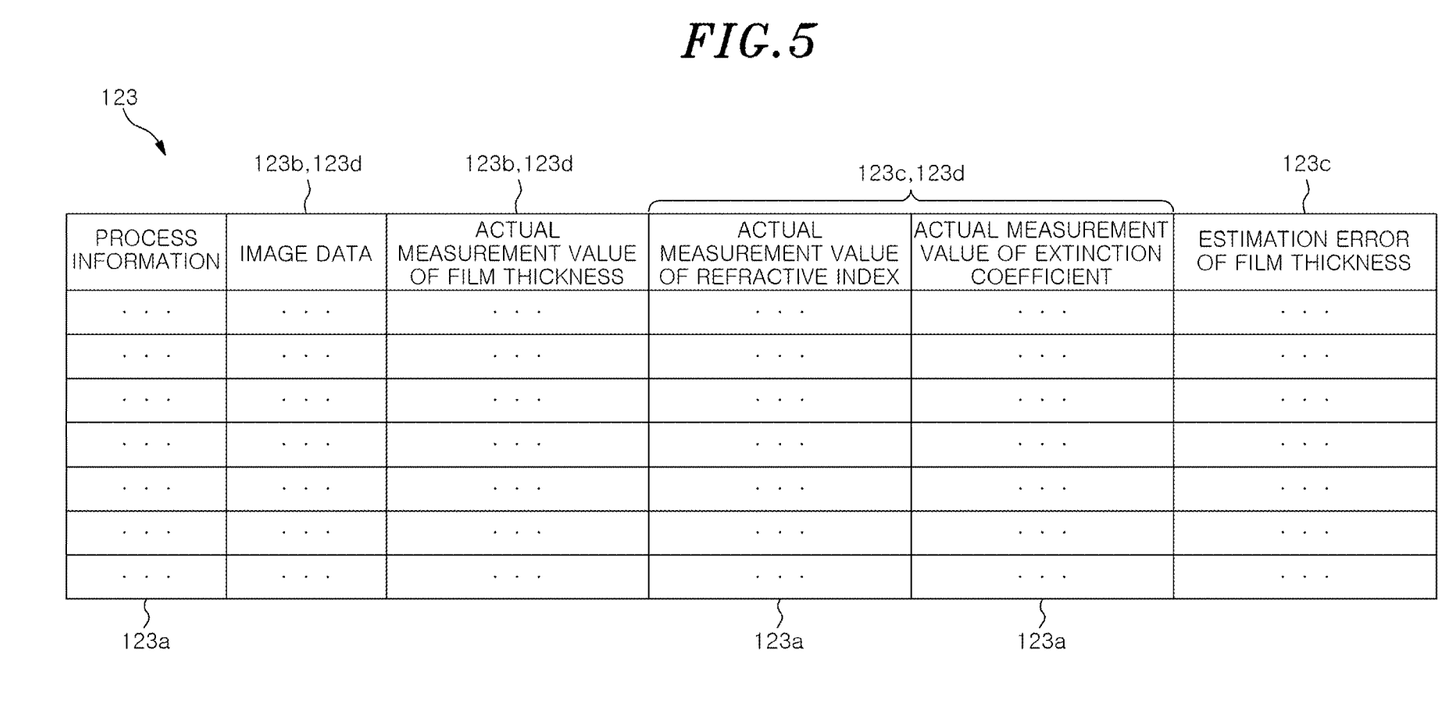
FIG. 5 is a table illustrating the contents of database for learning.

The data accumulation portion 122 accumulates, in the database 123, a record in which the process information acquired by the process unit 22, the surface image data acquired by the imaging portion 23, and the actual measurement data acquired by the actual measurement data acquisition portion 121 are associated with one another for each substrate W. FIG. 5 is a table illustrating the contents of the database 123. In FIG. 5, each row after the second row is one record. Each record contains the process information acquired by the process unit 22, the surface image data (address of a storage location of the surface image data) acquired by the imaging portion 23, the actual measurement value of the film thickness, the actual measurement value of the refractive index (actual measurement value of the optical property), and the actual measurement value of the extinction coefficient (actual measurement value of the optical property).

The database 123 includes a process database 123*a* and an image database 123*b*. The process database 123*a* is a database in which the process information and the actual measurement result of the optical property are associated and accumulated for each substrate W. The image database 123*b* is a database in which the surface image data and the actual measurement result of the film thickness are associated and accumulated.

Returning to FIG. 4, the optical property model generation portion 124 generates the optical property model by machine learning based on the process database 123*a* and stores the optical property model in the optical property model storage portion 112. The optical property estimation portion 113 estimates the optical property based on the optical property model generated by the optical property model generation portion 124.

The film thickness model generation portion 125 generates the film thickness model by machine learning based on the image database 123*b* and stores the film thickness model in the film thickness model storage portion 114. The film thickness estimation portion 116 estimates the film thickness based on the film thickness model generated by the film thickness model generation portion 125.

The error evaluation portion 126 evaluates the estimation error of the film thickness by the film thickness model generated by the film thickness model generation portion 125. For example, the error evaluation portion 126 estimates the film thickness based on the surface image data and the film thickness model for each record in the database 123, and calculates the estimation error of the film thickness by comparing the estimation result with an actual measurement value of the film thickness. The error evaluation portion 126 adds the estimation error of the film thickness to the record of the database 123. As a result, the database 123 further includes an error database 123*c* in which the actual measurement result of the optical property and the estimation error of the film thickness are associated with each other.

The error model generation portion 127 generates the error model by machine learning based on the error database 123*c* and stores the error model in the error model storage portion 115. The film thickness estimation portion 116 corrects the tentative estimation result of the film thickness based on the film thickness model based on the error model generated by the error model generation portion 127.

After the optical property model, the film thickness model, and the error model are generated, the film thickness model correction portion 128 further evaluates a film thickness error estimated by the film thickness estimation portion 116 based on the optical property and the surface image data. For example, the film thickness model correction portion 128 causes the film thickness estimation portion 116 to perform film thickness estimation based on the optical property and the surface image data for each record in the database 123, and evaluates an error by comparing the result with the actual measurement value of the film thickness. The film thickness model correction portion 128 corrects the film thickness model based on the error evaluation result. The film thickness model correction portion 128 may correct the optical property model instead of the film thickness model, or may correct both the film thickness model and the optical property model. The film thickness model correction portion 128 may correct the error model based on the error evaluation result.

The data accumulation portion 122 may continue to accumulate records in the database 123 even after the optical property model, the film thickness model, and the error model are generated by the optical property model generation portion 124, the film thickness model generation portion 125, and the error model generation portion 127. In this case, the optical property model generation portion 124, the film thickness model generation portion 125, and the error model generation portion 127 may update the optical property model, the film thickness model, and the error model based on the newly accumulated records.

In the above, the configuration in which the film thickness is tentatively estimated based on the surface image data and the film thickness model and then the tentative estimation result is corrected based on the estimation result of the optical property is illustrated, but the configuration of the control device 100 is not limited thereto.

For example, the film thickness estimation portion 116 may be configured to estimate the film thickness based on i) the film thickness model generated in advance to represent the relationship among the optical property, the surface image and the film thickness, ii) the estimation result of the optical property, and iii) the surface image. The data accumulation portion 122 described above includes an image database 123d in which the actual measurement result of the optical property, the surface image data, and the actual measurement result of the film thickness are associated with one another. By machine learning based on the image database 123d, the film thickness model generation portion 125 generates the film thickness model that represents the relationship among the optical property, the surface image and the film thickness.

According to this configuration, since the film thickness model in consideration of the influence of the optical property is generated, the error evaluation portion 126 and the error model generation portion 127 can be omitted.

The film thickness model may be generated in advance to represent the relationship among the optical properties at the plurality of locations, the surface image and the film thicknesses at the plurality of locations. The film thickness estimation portion 116 may estimate the film thickness at a plurality of locations based on the film thickness model, the estimation results of the optical properties at the plurality of locations, and the surface image.

Figure 6:
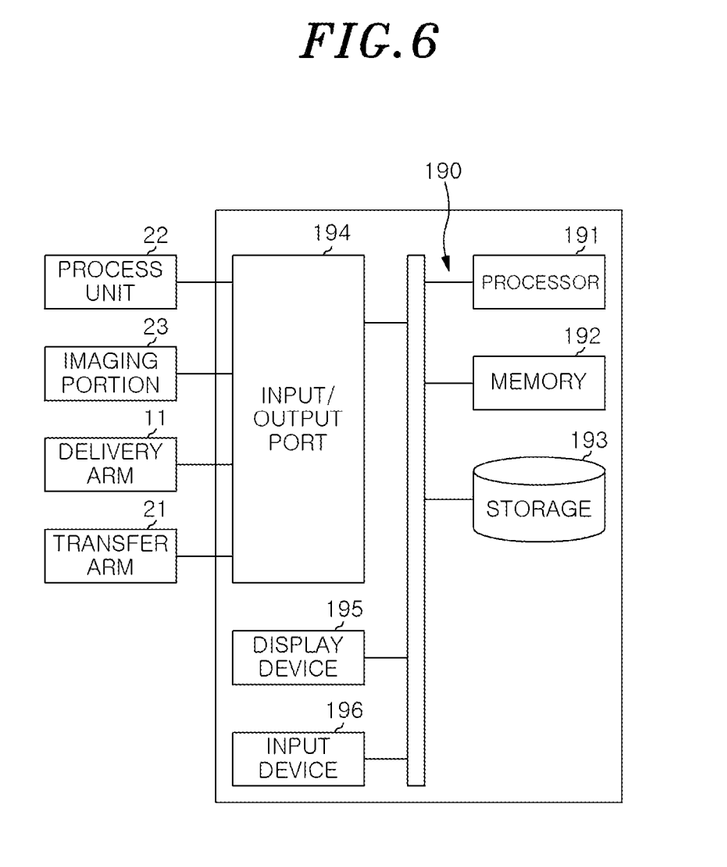
FIG. 6 is a block diagram illustrating a hardware configuration of the control device.

FIG. 6 is a block diagram illustrating a hardware configuration of the control device 100. As illustrated in FIG. 6, the control device 100 has a circuit 190. The circuit 190 includes one or more processors 191, a memory 192, a storage 193, an input/output port 194, a display device 195, and an input device 196. The storage 193 stores a program for causing the control device 100 to execute the substrate processing procedures including estimating the optical property of the film based on the process information acquired during the formation of the film and estimating the film thickness of the film based on the surface image and the estimation result of the optical property. For example, the storage 193 stores a program that causes the control device 100 to configure/implement each of the above-mentioned functional components.

The storage 193 includes a storage medium for storing the program and a device for reading data from the storage medium. Specific examples of the storage medium include a hard disk, a readable/writable non-volatile memory, a read-only memory (ROM), and the like.

The memory 192 is, for example, a Random Access Memory (RAM), and stores a program loaded from the storage 193. One or more processors 191 cause the control device 100 to configure each of the above-mentioned functional components by executing a program loaded in the memory 192. One or more processors 191 temporarily store an intermediate calculation result generated in the processing process in the memory 192.

The input/output port 194 outputs commands to the delivery arm 11, the transfer arm 21, the process unit 22, and the imaging portion 23 based on requests from the one or more processors 191. Further, the input/output port 194 acquires the process information and the like based on requests from the one or more processors 191.

The display device 195 displays information to an operator based on requests from the one or more processors 191. The input device 196 acquires an input by the operator and notifies the one or more processors 191 of the input contents.

Specific examples of the display device 195 include a liquid crystal monitor, an organic Electro-Luminescence (EL), and the like. Specific examples of the input device 196 include a keypad, a keyboard, a mouse, and the like. The input device 196 may be integrated with the display device 195 as a so-called touch panel.

[Substrate Processing Procedure]

Subsequently, as an example of the substrate processing method, a substrate processing procedure executed by the control device 100 will be illustrated. This procedure includes a model generation procedure and a substrate processing procedure. Each procedure will be described below.

(Model Generation Procedure)

Figure 7:
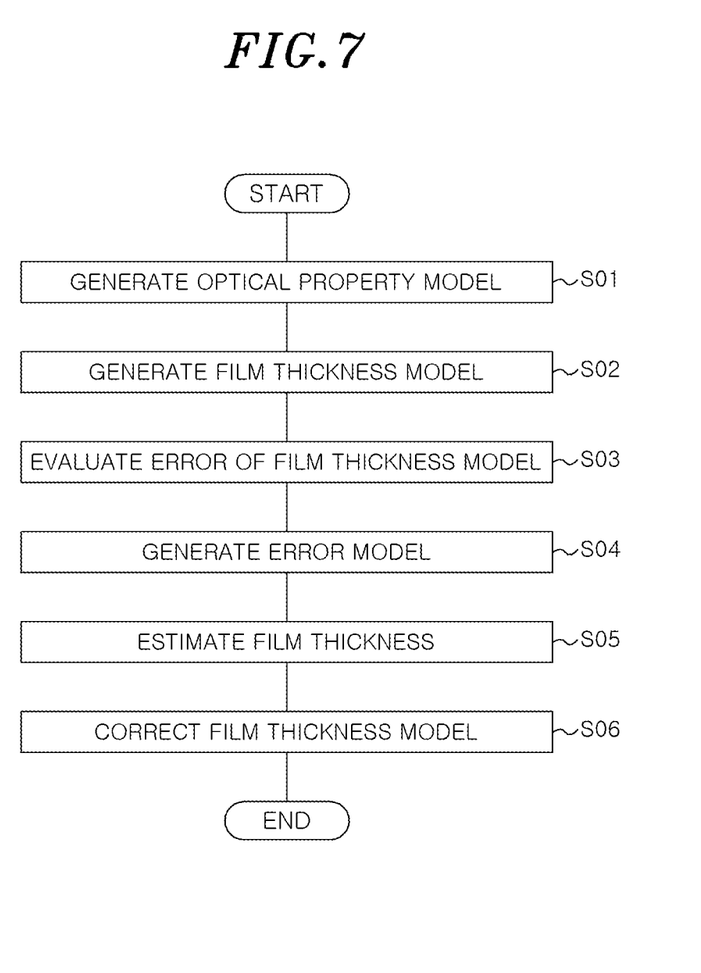
FIG. 7 is a flowchart illustrating a model estimation procedure.

This procedure can be executed when the number of records required for machine learning is accumulated in the database 123. As illustrated in FIG. 7, the control device 100 executes steps S01 and S02. In step S01, the optical property model generation portion 124 generates the optical property model by machine learning based on the process database 123a of the database 123, and stores it in the optical property model storage portion 112. In step S02, the film thickness model generation portion 125 generates the film thickness model by machine learning based on the image database 123b of the database 123 and stores it in the film thickness model storage portion 114.

Next, the control device 100 executes step S03. In step S03, the error evaluation portion 126 evaluates the estimation error of the film thickness by the film thickness model generated by the film thickness model generation portion 125. For example, the error evaluation portion 126 estimates the film thickness based on the surface image data and the film thickness model for each record in the database 123, and calculates the estimation error of the film thickness by comparing the estimation result with the actual measurement value of the film thickness. The error evaluation portion 126 adds the estimation error of the film thickness to the record of the database 123. As a result, the database 123 further includes the error database 123c.

Next, the control device 100 executes step S04. In step S04, the error model generation portion 127 generates the error model by machine learning based on the error database 123c and stores it in the error model storage portion 115.

Next, the control device 100 executes steps S05 and S06. In step S05, the film thickness model correction portion 128 causes the film thickness estimation portion 116 to perform film thickness estimation based on the optical property and the surface image data for each record in the database 123. In step S06, the film thickness model correction portion 128 evaluates an error by comparing the estimation result of the film thickness by the film thickness estimation portion 116 with the actual measurement value of the film thickness, and corrects the film thickness model based on the error evaluation result. This completes the model generation procedure.

In addition, the generation of the film thickness model in step S02 may be executed prior to the generation of the optical property model in step S01. Further, the generation of the film thickness model in step S02 and the generation of the optical property model in step S01 may be executed at least partially in parallel.

(Substrate Processing Procedure)

Figure 8:
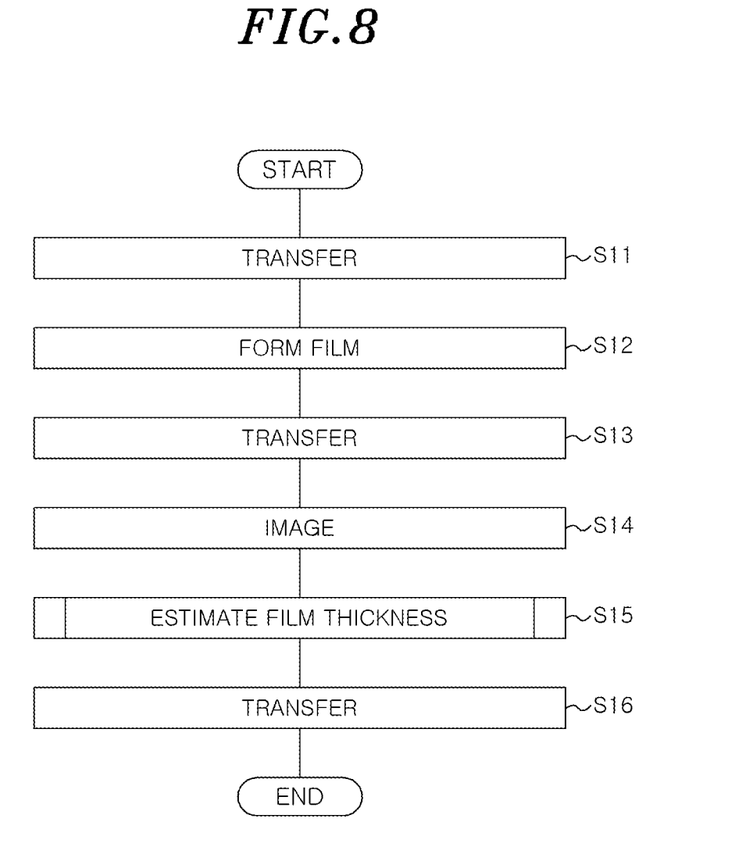
FIG. 8 is a flowchart illustrating a substrate processing procedure.

As illustrated in FIG. 8, the control device 100 executes steps S11, S12, S13, S14, S15, and S16. In step S11, the processing controller 111 controls the delivery arm 11 to take out the substrate W from the carrier 12 and load it into the load lock module 25. Further, the processing controller 111 controls the transfer arm 21 to receive the substrate W loaded into the load lock module 25 by the delivery arm 11 and load it into the process unit 22. In step S12, the processing controller 111 controls the process unit 22 to form a film on the surface of the substrate W. In step S13, the processing controller 111 controls the transfer arm 21 to receive the substrate W from the process unit 22 and load it into the imaging portion 23. In step S14, the processing controller 111 controls the imaging portion 23 to acquire the surface image data. In step S15, the film thickness estimation portion 116 estimates a film thickness. The specific contents of step S15 will be described later. In step S16, the processing controller 111 controls the transfer arm 21 to receive the substrate W from the imaging portion 23 and transfer it to the load lock module 25, and controls the delivery arm 11 to return the substrate W received from the load lock module 25 to the carrier 12.

Figure 9:
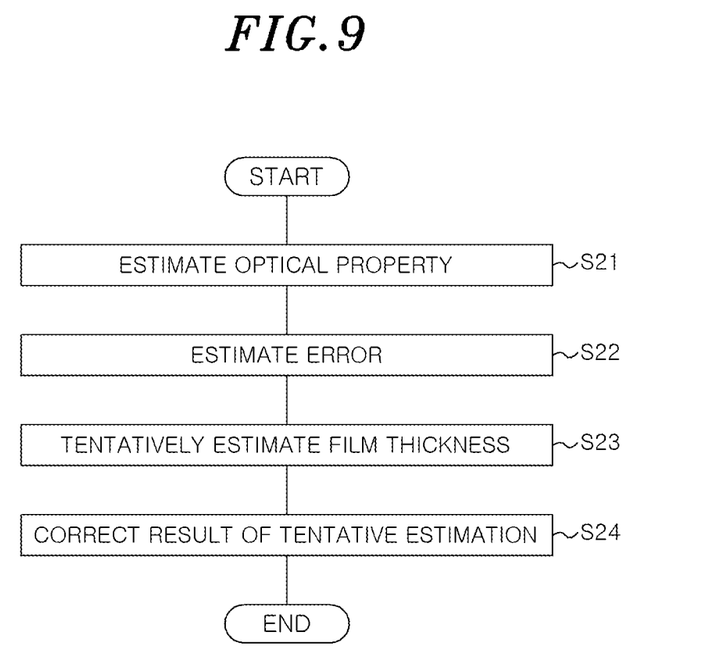
FIG. 9 is a flowchart illustrating a film thickness estimation procedure.

FIG. 9 is a flowchart illustrating a procedure for estimating the film thickness in step S16. As illustrated in FIG. 9, the control device 100 executes steps S21, S22, S23, and S24. In step S21, the optical property estimation portion 113 estimates an optical property of the film based on the process information acquired by the process unit 22 and the optical property model stored in the data accumulation portion 122. In step S22, the film thickness estimation portion 116 estimates an estimation error of the film thickness based on the optical property estimated by the optical property estimation portion 113 and the error model stored in the error model storage portion 115. In step S23, the film thickness estimation portion 116 tentatively estimates the film thickness based on the film thickness model stored in the film thickness model storage portion 114 and the surface image data acquired by the imaging portion 23. In step S24, the film thickness estimation portion 116 corrects the tentative estimation result of the film thickness based on the estimation error of the film thickness. This completes the procedure for estimating the film thickness. In addition, the tentative estimation of the film thickness in step S23 may be executed prior to the estimation of the estimation error in step S22, or may be executed prior to the estimation of the optical property in step S21. Further, step S23 may be executed at least partially in parallel with at least one of steps S21 and S22.

Effect of the Embodiments

The substrate processing apparatus 1 according to one aspect of the present disclosure includes the imaging portion 23 for acquiring the surface image of the film formed on the surface of the substrate, the optical property estimation portion 113 for estimating the optical property of the film based on the process information acquired during the formation of the film, and the film thickness estimation portion 116 for estimating the film thickness of the film based on the surface image and the estimation result of the optical property.

There is a correlation between the surface image and the film thickness. For example, the color of the surface image may change depending on the film thickness. Accordingly, it is possible to estimate the film thickness based on the surface image. However, the relationship between the surface image and the film thickness can change depending on the optical property of the film. On the other hand, the substrate processing apparatus 1 estimates the optical property based on the process information, and estimates the film thickness based on the surface image and the estimation result of the optical property. Accordingly, it is effective for easily estimating the film thickness with high reliability.

The optical property estimation portion 113 may estimate the optical property based on the optical property model generated in advance to represent the relationship between the process information and the optical property, and the process information. The optical property can be easily estimated with higher reliability.

The film thickness estimation portion 116 may tentatively estimate the film thickness based on the film thickness model generated in advance to represent the relationship between the surface image and the film thickness, and the surface image, and estimate the film thickness by correcting the tentative estimation result of the film thickness based on the optical property estimated by the optical property estimation portion 113. The estimation result of the optical property can be easily reflected in the estimation result of the film thickness.

The film thickness estimation portion 116 may estimate the error based on the error model generated in advance to represent the relationship between the optical property and the estimation error of the film thickness, and the optical property estimated by the optical property estimation portion 113, and estimate the film thickness by correcting the tentative estimation result of the film thickness based on the estimation result of the error. The estimation result of the optical property can be easily reflected in the estimation result of the film thickness.

The film thickness model may be generated in advance to represent the relationship between the surface image and the film thicknesses at the plurality of locations on the surface of the substrate, and the film thickness estimation portion 116 may estimate the film thicknesses at the plurality of locations based on the film thickness model and the surface image. The film thickness of each part of the substrate can be easily estimated.

The optical property model may be generated in advance to represent the relationship between the process information and the optical properties at the plurality of locations, the optical property estimation portion 113 may estimate the optical properties at the plurality of locations based on the optical property model and the process information, and the film thickness estimation portion 116 may correct each of the tentative estimation results of the film thicknesses at the plurality of locations based on the estimation results of the optical properties at the plurality of locations. The film thickness of each part of the substrate can be estimated with higher reliability.

The optical property model generation portion 124 which generates the optical property model by machine learning based on the process database accumulated by associating the process information with the actual measurement result of the optical property, and the film thickness model generation portion 125 which generates the film thickness model by machine learning based on the image database accumulated by associating the surface image with the actual measurement result of the film thickness are further provided. The optical property estimation portion 113 may estimate the optical property based on the optical property model generated by the optical property model generation portion 124, and the film thickness estimation portion 116 may estimate the film thickness based on the film thickness model generated by the film thickness model generation portion 125. The optical property can be estimated with higher reliability, and the film thickness can be estimated with higher reliability.

The film thickness model correction portion 128 which corrects the film thickness model based on the comparison between the estimation result of the film thickness by the film thickness estimation portion 116 and the actual measurement result of the film thickness may be further provided. The film thickness can be estimated with higher reliability.

The film thickness estimation portion 116 may estimate the film thickness based on the film thickness model generated in advance to represent the relationship among the optical property, the surface image and the film thickness, the estimation result of the optical property, and the surface image. The estimation result of the optical property can be reflected in the estimation result of the film thickness with higher reliability.

The optical property model may be generated in advance to represent the relationship between the process information and the optical properties at the plurality of locations on the surface of the substrate, the optical property estimation portion 113 may estimate the optical properties at the plurality of locations based on the optical property model and the process information, the film thickness model may be generated in advance to represent the relationship among the optical properties at the plurality of locations, the surface image and the film thicknesses at the plurality of locations, and the film thickness estimation portion 116 may estimate the film thicknesses at the plurality of locations based on the film thickness model, the estimation results of the optical properties at the plurality of locations, and the surface image. The film thickness of each part of the substrate can be easily estimated.

The optical property model generation portion 124 which generates the optical property model by machine learning based on the process database accumulated by associating the process information with the actual measurement result of the optical property, and the film thickness model generation portion 125 which generates the film thickness model by machine learning based on the image database accumulated by associating the surface image with the actual measurement result of the optical property and the actual measurement result of the film thickness may be further provided. The optical property estimation portion 113 may estimate the optical property based on the optical property model generated by the optical property model generation portion 124, and the film thickness estimation portion 116 may estimate the film thickness based on the film thickness model generated by the film thickness model generation portion 125. The optical property can be estimated with higher reliability, and the film thickness can be estimated with higher reliability.

Although the embodiments have been described above, the present disclosure is not necessarily limited to the above-described embodiments, and can be appropriately changed without departing from the gist thereof.

The invention claimed is:

1. A substrate processing apparatus comprising:
an imaging portion configured to acquire a surface image of a film formed on a surface of a substrate, including:
a housing accommodating the substrate; and
a camera imaging the surface image of the film formed on the surface of the substrate; and
a controller including a processor and a memory storing instructions thereon, the instructions when executed by the processor cause the processor to:
estimate an optical property of the film based on process information acquired during formation of the film by inputting the process information into an optical property model that represents a relationship between the process information and the optical property, and the optical property model outputting the estimated optical property of the film in response to the process information, wherein the optical property includes at least one of a refractive index and an extinction coefficient and the process information includes surrounding environment information of the substrate when the film is formed on the surface of the substrate;
estimate a film thickness of the film by inputting the surface image into a film thickness model that represents a relationship between the surface image and the film thickness, the film thickness model outputting an estimated thickness of the film in response to the surface image; and
correct the estimated thickness of the film based on the estimated optical property output by the optical property model.

2. The substrate processing apparatus of claim 1, wherein the instructions when executed by the processor further cause the processor to estimate the film thickness by estimating an error by inputting the optical property to an error model that is generated in advance to represent a relationship between the optical property and the error of the film thickness and the estimated optical property, and the error model outputting the error in response to the optical property.

3. The substrate processing apparatus of claim 1, wherein the film thickness model is generated in advance to represent a relationship between the surface image and film thicknesses at a plurality of locations on the surface of the substrate, and
wherein the instructions when executed by the processor further cause the processor to estimate the film thicknesses at the plurality of locations based on the film thickness model and the surface image.

4. The substrate processing apparatus of claim 3, wherein the optical property model is generated in advance to represent a relationship between the process information and the optical properties at the plurality of locations, and
wherein the instructions when executed by the processor further cause the processor to:
estimate the optical properties at the plurality of locations based on the optical property model and the process information, and
correct each of the estimation results of the film thicknesses at the plurality of locations based on an estimation result of the optical properties at the plurality of locations.

5. The substrate processing apparatus of claim 1, wherein the instructions when executed by the processor further cause the processor to:
generate the optical property model by machine learning based on process database accumulated by associating the process information with an actual measurement result of the optical property; and
generate the film thickness model by machine learning based on image database accumulated by associating the surface image with an actual measurement result of the film thickness.

6. The substrate processing apparatus of claim 5, wherein the instructions when executed by the processor further cause the processor to correct the film thickness model based on a comparison between an estimation result of the film thickness and the actual measurement result of the film thickness.

7. The substrate processing apparatus of claim 1, wherein the process information includes surrounding environment information of the substrate when the film formed on the surface of the substrate is partially removed.

8. A substrate processing method, comprising:
acquiring a surface image of a film formed on a surface of a substrate by a camera;

estimating an optical property of the film based on process information acquired during formation of the film by inputting the process information into an optical property model that represents a relationship between the process information and the optical property, and the optical property model outputting the estimated optical property of the film in response to the process information, wherein the optical property includes at least one of a refractive index and an extinction coefficient and the process information includes surrounding environment information of the substrate when the film is formed on the surface of the substrate;

estimating a film thickness of the film by inputting the surface image into a film thickness model that represents a relationship between the surface image and the film thickness, the film thickness model outputting an estimated thickness of the film in response to the surface image; and correcting the estimated thickness of the film based on the estimated optical property output by the optical property model.

9. A non-transitory computer-readable storage medium storing instructions thereon, the instructions when executed by a processor cause the processor to:

acquire a surface image of a film formed on a surface of a substrate by a camera;

estimate an optical property of the film by inputting process information into an optical property model that represents a relationship between the process information and the optical property, and the optical property model outputting the estimated optical property of the film in response to the process information, wherein the optical property includes at least one of a refractive index and an extinction coefficient and the process information includes surrounding environment information of the substrate when the film is formed on the surface of the substrate;

estimate a film thickness of the film by inputting the surface image into a film thickness model that represents a relationship between the surface image and the film thickness, the film thickness model outputting an estimated thickness of the film in response to the surface image; and correcting the estimated thickness of the film based on the estimated optical property output by the optical property model.

* * * * *